Figure 1:
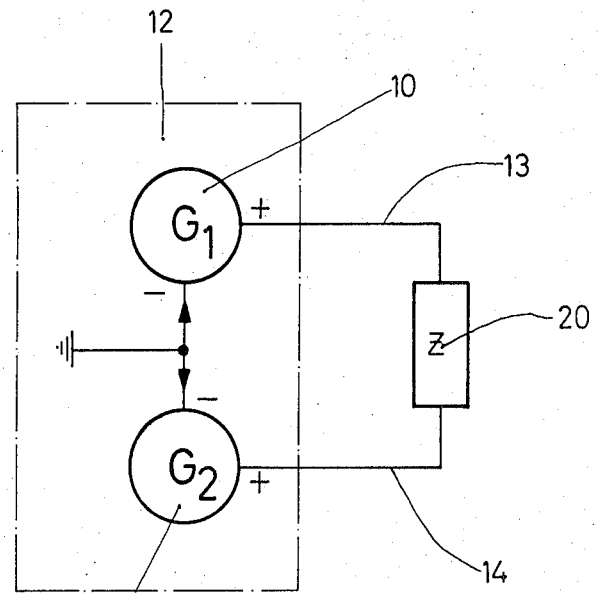

United States Patent [19]
Barbacsy et al.

[11] 3,710,153
[45] Jan. 9, 1973

[54] MAGNETOHYDRODYNAMIC (MHD) ALTERNATING CURRENT GENERATOR

[75] Inventors: Ludwig Benno Barbacsy; Gunther Muck, Plantikow, Ulrich, Munich, Germany

[73] Assignee: Messerschmitt-Bolkow-Blohm GmbH, Munich, Germany

[22] Filed: Oct. 20, 1970

[21] Appl. No.: 82,411

[30] Foreign Application Priority Data

Oct. 22, 1969 Germany.................P 19 53 163.6

[52] U.S. Cl.....................................................310/11
[51] Int. Cl...............................................H02n 4/02
[58] Field of Search ..........................310/11; 417/50

[56] References Cited

UNITED STATES PATENTS

| | | | |
|---|---|---|---|
| 3,257,571 | 6/1966 | Jones | 310/11 |
| 3,258,685 | 6/1966 | Horton | 324/34 |
| 3,489,933 | 1/1970 | Meyerand et al | 310/11 |

*Primary Examiner*—D. X. Sliney
*Attorney*—Woodhams, Blanchard and Flynn

[57] ABSTRACT

An MHD alternating current generator for electric power supply, preferably for aerospace application having a liquid, conducting medium, e.g., a liquid metal, which is alternately moved in only one of, e.g., two channels which are located within a steady magnetic field perpendicular to the direction of flow "A," the magnetic field being produced by superconducting coils.

7 Claims, 5 Drawing Figures

3,710,153

MAGNETOHYDRODYNAMIC (MHD) ALTERNATING CURRENT GENERATOR

The invention relates to a magnetohydrodynamic (MHD) alternating current generator for electric power supply, preferably for aerospace applications.

Prior art MHD alternating current generators are operated by means of moving magnetic fields only. The drawback with this device is that excessive energy losses are sustained in producing the alternating current. This is due to the fact that it is almost impossible to produce the moving magnetic field by means of superconducting coils because the required engineering effort and the energy losses cannot be tolerated.

The object of the present invention is to create a device which considerably reduces the engineering effort and energy losses and results in an alternating current generator with an extremely favorable power/weight ratio, which is therefore primarily suitable for airborne power supply systems in air and spacecraft.

This task is solved by having a flowing and conducting medium, e. g., liquid metal, alternately move in one of two channels which are located in a steady magnetic field perpendicular to the flow direction; this magnetic field is produced by superconductive coils.

A further embodiment of the invention suggests that the conducting medium automatically flows through only one of the two channels at one time.

It is also suggested that alternating currents with any desired phase relations be generated, e. g., three phase current, by increasing the number of channels.

Furthermore, it is suggested that the conducting medium be moved in a known way through the conduit system by means of a jet injection pump coupled with a reactor. These measures of the invention result in a weight and space saving device which is primarily suitable for air and spacecraft, as it has no mechanical parts and is therefore highly reliable.

The invention is described and drawn in the following which also discloses additional features and advantages. The figures show:

FIG. 1 a schematic block diagram of the system.

Figure 2:
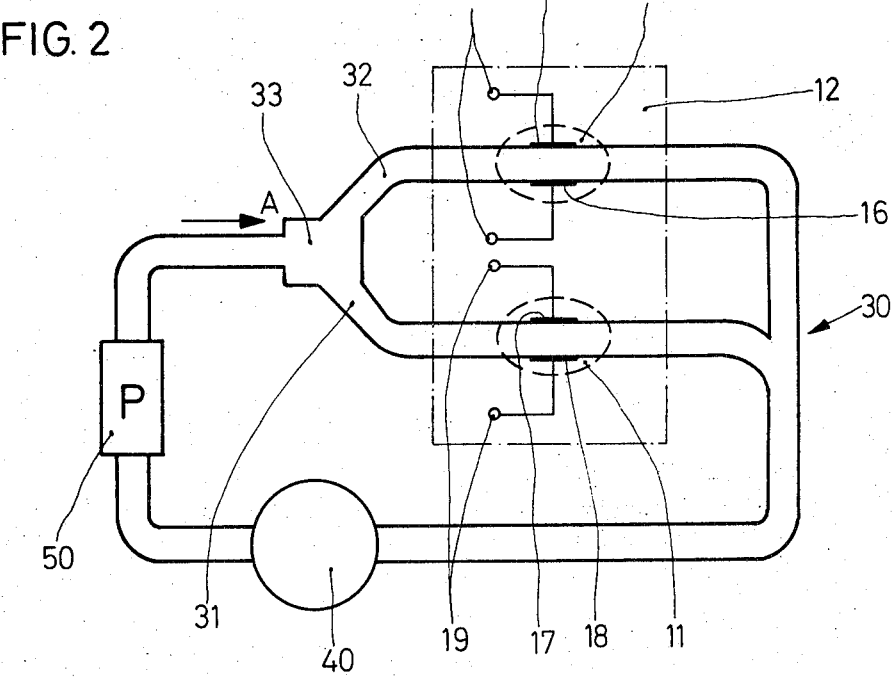

FIG. 2 a schematic representation of the system arrangement.

Figure 3:
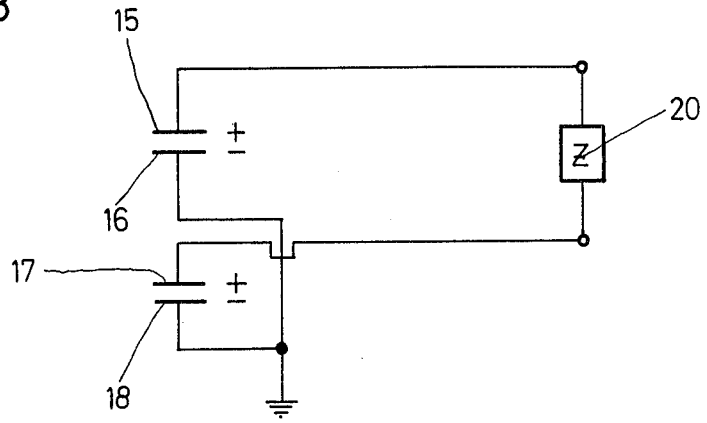

FIG. 3 a circuit diagram according to the invention as in FIG. 2.

Figure 4:
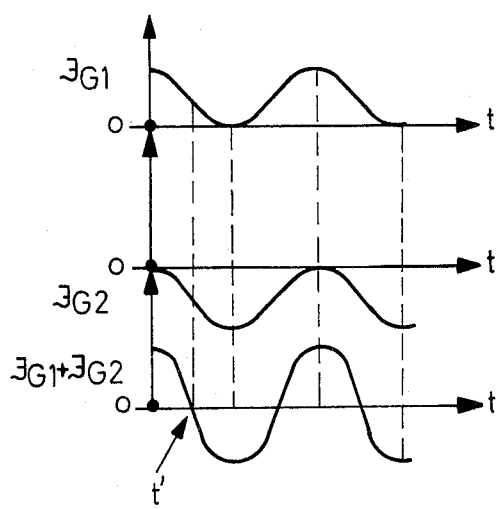

FIG. 4 a time diagram of the system according to the invention.

Figure 5:
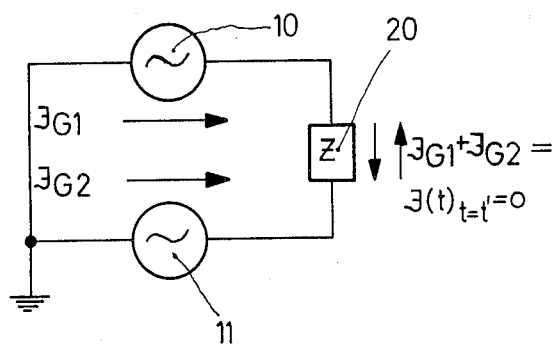

FIG. 5 another circuit diagram of the arrangement.

FIG. 1 represents a schematic block diagram of the system, according to which the positive poles 13, 14 of the two generators 10 and 11 are located on one load 20. The generators 10, 11 are connected with each other through their respective negative poles. FIG. 2 shows the layout of the system according to the invention. In a conduit system 30, a liquid or gaseous conductive medium is set in motion by means of a power source 40 — which may be a reactor. The conduit system 30 divides into two channels 31, 32 before it reaches the area of the steady magnetic field 12. This magnetic field 12 is positioned at right angles to the flow direction "A" of the conducting liquid medium. The interaction between the medium and the magnetic field 12 induces, in a known way, a voltage at the electrodes 15, 16 and 17, 18 of the channels 32, 31. A current now flows through the load 20 connected to the terminals 19. FIG. 3 shows the electric diagram of the electrodes 15 and 18 and the load 20.

The MHD alternating current generator operates as follows:

When, for example, the medium flows through channel 32 and is at rest in channel 31, a voltage is induced at generator 10. Later, the circuit is closed through the terminals 19, the load 20 and the generator 11. The resulting electric current between the electrodes 17, 18 of the generator 11 interacts with the magnetic field which is perpendicular to the said current; thus, the JB force accelerates, in a known way, the conducting medium in channel 31 in the direction of flow "A," while the medium flowing in channel 32 is reduced to almost zero flow velocity due to the same force which is now acting in the opposite direction. This process is now repeated in the reverse way for channel 31 and so on continuously. Deflection of the jet and its stable positioning in only one of the two channels 31, 32 at one time is accomplished by a fluidic element (wall attachment element) 33 which forms the bifurcation in the line. The direction of flow in the element is controlled automatically by the above-mentioned accelerative and decelerative forces in the generators 10, 11 since the element itself reacts to load changes. Thus, the electrode output terminals 19 deliver, in a surprisingly simple way, an alternating current. To propel the medium, a pump 50 may be used, a reactor 40 being utilized as a power source. The pump 50 will preferably be a jet injection pump.

In FIG. 4, the currents $I_{G1}$, $I_{G2}$ and $I_z = I_{G1} + I_{G2}$ have been plotted as a function of time $t$. The block diagram in FIG. 5 shows, as an example, the current situations at the generators 10, 11 and at the resistance or load 20 at time $t'$. The position of $t'$ is illustrated in FIG. 4.

The embodiments of the invention in which an exclusive property or privilege is claimed are defined as follows:

1. An MHD alternating current generator for electric power supply, suitable for aerospace applications, comprising in combination:
   a conduit system including two channels;
   a liquid, conducting medium in said conduit system and alternately movable in said two channels;
   means including superconducting coils for providing a steady magnetic field substantially perpendicular to the direction of movement of said medium in said channels, said channels being located in said magnetic field.

2. An MHD alternating current generator according to claim 1 including means responsive to forces on the medium in said channels for automatically switching medium flow from one channel to the other.

3. An MHD alternating current generator according to claim 2 including a plurality of pairs of said channels for providing a corresponding plurality of phases of alternating current.

4. An MHD alternating current generator according to claim 1 in which said conduit system includes means for moving said medium therethrough comprising a jet injector pump and a reactor coupled thereto.

5. An MHD alternating current generator according to claim 2 in which said means for switching comprises a wall attachment type fluidic element forming a bifurcation connecting said two channels to a remaining, flow supplying portion of said conduit system and responsive to liquid load changes for switching flow back and forth between said channels, in which said load changes comprise accelerative and decelerative forces on the medium in said channels.

6. An MHD alternating current generator according to claim 5 including a pair of electrodes on opposite sides of each channel and spaced across said magnetic field, an electrical load, means connecting said electrode pairs in series with each other and across said electrical load for decelerating medium flow in one channel and accelerating medium flow in the other channel to change said liquid load in response to current flow through said electrode pairs and across said magnetic field and resulting from medium flow through said one channel;

whereby the direction of medium flow through said fluidic element is automatically directly controlled by magnetic field forces on the medium in said channels.

7. An MHD alternating current generator according to claim 6 in which said electrode pairs have first electrodes connected to each other and second electrodes connected to opposite sides of said electrical load, said second electrodes having the same polarity but producing oppositely changing voltage amplitudes.

* * * * *